(12) United States Patent
Sakakibara et al.

(10) Patent No.: US 8,484,952 B2
(45) Date of Patent: Jul. 16, 2013

(54) DEVICE FOR PURIFICATION OF EXHAUST GAS

(75) Inventors: Yuji Sakakibara, Nisshin (JP); Yoshihiko Itoh, Aichi (JP); Koji Yokota, Nagoya (JP); Kouzi Banno, Nagoya (JP); Hirohito Hirata, Shizuoka (JP); Masaru Kakinohana, Susono (JP); Masaya Ibe, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 296 days.

(21) Appl. No.: 12/303,814

(22) PCT Filed: Jun. 6, 2007

(86) PCT No.: PCT/JP2007/061845
§ 371 (c)(1),
(2), (4) Date: Jul. 20, 2010

(87) PCT Pub. No.: WO2007/142355
PCT Pub. Date: Dec. 13, 2007

(65) Prior Publication Data
US 2010/0281856 A1 Nov. 11, 2010

(30) Foreign Application Priority Data
Jun. 9, 2006 (JP) ................................. 2006-160814

(51) Int. Cl.
*F01N 3/023* (2006.01)
*F01N 3/029* (2006.01)
*F01N 3/035* (2006.01)
*F01N 3/20* (2006.01)
*B01D 53/92* (2006.01)

(52) U.S. Cl.
USPC ................... 60/289; 60/286; 60/295; 60/297; 60/311

(58) Field of Classification Search
USPC .......................... 60/286, 295, 289, 297, 311
See application file for complete search history.

(56) References Cited

U.S. PATENT DOCUMENTS

| 5,440,876 | A * | 8/1995 | Bayliss et al. ................. 60/274 |
| 6,772,584 | B2 * | 8/2004 | Chun et al. ..................... 60/275 |
| 6,775,972 | B2 * | 8/2004 | Twigg et al. .................... 60/275 |
| 2004/0045279 | A1 | 3/2004 | Pfendtner et al. |
| 2004/0060281 | A1 | 4/2004 | Breuer et al. |
| 2006/0162297 | A1 * | 7/2006 | Hartherz ..................... 55/282.3 |

FOREIGN PATENT DOCUMENTS

| CN | 1135568 | 11/1996 |
| CN | 2425206 | 3/2001 |
| CN | 2714814 | 8/2005 |

(Continued)

*Primary Examiner* — Kenneth Bomberg
*Assistant Examiner* — Dapinder Singh
(74) *Attorney, Agent, or Firm* — Finnegan, Henderson, Farabow, Garrett & Dunner, LLP

(57) ABSTRACT

A device for purification of exhaust gas including: an exhaust gas passage 15 connected to an internal combustion engine 10; a particulate matter trapping device 30 which is disposed in the exhaust gas passage 15, and which traps particulate matters in exhaust gas; ozone supply means 40 which is connected to the exhaust gas passage 15 and on an upstream side of the particulate matter trapping device 30, and which can supply ozone to the particulate matter trapping device 30; and an NO oxidizing catalyst 20 which is disposed in the exhaust gas passage 15 and on an upstream of the ozone supply means 40, and which oxidizes NO in the exhaust gas.

6 Claims, 2 Drawing Sheets

FOREIGN PATENT DOCUMENTS

| | | |
|---|---|---|
| CN | 2767671 | 3/2006 |
| EP | 1 026 373 A3 | 8/2000 |
| GB | 2274412 * | 7/1994 |
| JP | 57-30524 | 2/1982 |
| JP | 6-272541 | 9/1994 |
| JP | 9-125931 | 5/1997 |
| JP | 2002-531762 | 9/2002 |
| JP | 2005-502823 | 1/2005 |
| WO | WO 00/34632 | 6/2000 |
| WO | WO 03/027452 A1 | 4/2003 |

* cited by examiner

DEVICE FOR PURIFICATION OF EXHAUST GAS

TECHNICAL FIELD

The present invention relates to a device for purification of exhaust gas, and specifically relates to a device for purification of exhaust gas emitted from an internal combustion engine such as a diesel engine using particulate matter trapping device for trapping particulate matters in exhaust gas.

BACKGROUND ART

In general, the exhaust gas of a diesel engine is known to contain particulate matters (hereinafter, referred to as PM (Particulate Matter)) containing a carbon as a main component, and to cause air pollution. For this reason, various kinds of devices and methods are proposed for trapping and removing these particulate matters from exhaust gas. For example, (i) a method in which PMs which have been trapped are oxidized and burned by increasing the temperature of a diesel particulate filter (hereinafter, referred to as "DPF") by forcibly injection-supplying a fuel, (ii) a method in which $NO_2$ is produced from NO in the exhaust gas, and the PMs are oxidized by the $NO_2$ (for example, International Application Japanese-Phase Publication No. 2002-531762 (document 1)), and (iii) a method in which PMs are oxidized using the catalyzed DPF (for example, Japanese Unexamined Patent Application Publication No. Hei 6-272541 (Document 2), and Japanese Unexamined Patent Application Publication No. Hei 9-125931 (Document 3)) are proposed.

However, in the method (i), there were problems that reduction in fuel cost performance was caused because of the forcible injection-supply of the fuel, and also that the PMs rapidly burned, resulting in the breakage of the DPF due to a rapid change in temperature derived from the reaction heat generated during the rapid burning of the PMs. Moreover, in the method (ii), there was a problem that the oxidation rate of the PMs by $NO_2$ was insufficient, and thereby it was difficult to completely oxidize and remove the PMs emitted from the engine. Furthermore, in the method (iii), there was a problem that, both the catalyst and the PMs were solid, so that the catalyst and the PMs were not sufficiently in contact with each other, resulting in insufficient oxidation reaction of the PMs.

Recently, a technology has been disclosed (for example, International Application Japanese-Phase Publication No. 2005-502823 (Document 4)). The technology is to oxide and treat PMs using ozone ($O_3$) having a strong oxidizing power as compared to $NO_2$. In the method described in the Document 4 by which the exhaust gas of a diesel engine is after-treated, the PMs trapped in the particulate filter are oxidized and removed by mounting, on the upstream of the particulate filter, a device for producing ozone or $NO_2$, which serve as an oxidant, from the exhaust gas using a plasma in order to selectively use ozone and $NO_2$ at low temperatures, and $NO_2$ at high temperatures corresponding to the temperature of the exhaust gas.

However, in the method described in Document 4, ozone is formed from oxygen, which is a component of the exhaust gas, using the plasma, and the exhaust gas containing $NO_X$ and the like is introduced into the particulate filter together with the formed ozone. Thereby, the ozone having a strong oxidizing power is reacted with $NO_X$ and the like in the exhaust gas, and is consumed before entering the particulate filter. As a result, the amount of the ozone to be used for the oxidation and removal of the PMs is reduced, and thereby a sufficient efficiency of purification is not obtained. Accordingly, there was a problem that the oxidation rate of the PMs was reduced.

DISCLOSURE OF THE INVENTION

The present invention has been made in consideration of the problems of the above described prior art. It is an object of the present invention to provide a device for purification of exhaust gas emitted from an internal combustion engine, such as a diesel engine, using a particulate matter trapping device for trapping PMs in exhaust gas, in which a high level PM purification efficiency is achieved by making it possible to efficiently use ozone in oxidizing and removing the PMs using the ozone, and by sufficiently suppressing the reduction in the oxidation rate of the PMs caused by $NO_X$ and the like.

The present inventors devoted themselves to keen studies for achieving the above object, and, as a result, found that the consumption of ozone due to the reaction with $NO_X$ is suppressed by disposing an NO oxidizing catalyst on the upstream side of ozone supply means, sufficiently suppressing the reduction in the oxidation rate of the PMs, and thereby resulting in the achievement of the high level PM purification efficiency, because ozone tends to react with $NO_X$ and HC in the exhaust gas, especially NO. Thus the present inventors came to complete the present invention.

The device for purification of exhaust gas according to the present invention includes:

an exhaust gas passage connected to an internal combustion engine;

a particulate matter trapping device which is disposed in the exhaust gas passage, and which traps particulate matters in exhaust gas;

ozone supply means which is connected to the exhaust gas passage and on an upstream side of the particulate matter trapping device, and which can supply ozone to the particulate matter trapping device; and an NO oxidizing catalyst which is disposed in the exhaust gas passage and on an upstream side of the ozone supply means, and which oxidizes NO in exhaust gas.

According to the above device for purification of exhaust gas of the present invention, the NO oxidizing catalyst is disposed on the upstream side of the ozone supply means, and thereby at least a part of the NO in the exhaust gas is previously oxidized to $NO_2$ by the NO oxidizing catalyst on the upstream side of the ozone supply means, the amount of NO which particularly tends to react with ozone is reduced. As a result, the consumption of ozone by the $NO_X$ in exhaust gas is suppressed, much larger amount of ozone can be used to oxidize and remove the PMs in the particulate matter trapping device. Therefore, the reduction in the oxidation rate of the PMs is sufficiently suppressed, achieving the high level PM purification efficiency.

The device for purification of exhaust gas of the present invention preferably further includes: exhaust gas temperature detecting means for measuring or estimating the temperature of the exhaust gas passing through the particulate matter trapping device; and ozone supply control means for controlling the ozone supply means based on the temperature of the exhaust gas detected by the exhaust gas temperature detecting means. In this case, the ozone supply control means particularly preferably controls the ozone supply means such that ozone is supplied when the temperature of the exhaust gas is within a range between the first predetermined temperature of 50° C. or more and the second predetermined temperature of 300° C. or less.

NO tends to be more efficiently oxidized to $NO_2$ by the NO oxidizing catalyst when the temperature of the exhaust gas is 50° C. or more. The reactivity between NO and ozone tends to be higher than that between $NO_2$ and ozone when the temperature of the exhaust gas is 300° C. or less. Therefore, according to such a suitable device for purification of exhaust gas of the present invention, the consumption of ozone by $NO_X$ in exhaust gas is more surely suppressed. As a result, the reduction in the oxidation rate of the PM is more sufficiently suppressed, and thereby the high level PM purification efficiency is achieved.

Moreover, in the present invention, the ozone supply control means more preferably controls the ozone supply means such that ozone is supplied when the amount of the particulate matters trapped in the particulate matter trapping device is at the predetermined value or more.

The ozone supply means according to the present invention preferably includes: an ozonizer which serves as ozone generating means; an ozone supply passage connected to the ozonizer; an ozone supply nozzle which is connected to the ozone supply passage, and which is disposed in the exhaust gas passage and on the upstream side of the particulate matter trapping device. In addition, such an ozonizer more preferably generates ozone while air or oxygen which serves as a raw material is being flowed in an electric discharge tube to which a high voltage can be applied. The air or oxygen which serves as the raw material is particularly preferably a gas which is taken in from the outside of the exhaust gas passage.

The NO oxidizing catalyst according to the present invention preferably includes a porous oxide support and a noble metal supported thereto, and can oxidize NO in exhaust gas to $NO_2$.

Furthermore, in the present invention, the particulate matter trapping device preferably substantially does not include a catalyst which decomposes ozone.

According to the present invention, it becomes possible to provide a device for purification of the exhaust gas emitted from an internal combustion engine, such as a diesel engine, using a particulate matter trapping device for trapping the PMs in the exhaust gas in which the high level PM purification efficiency can be achieved by making it possible to efficiently use ozone in oxidizing and removing the PMs using ozone, and by sufficiently suppressing the reduction in the oxidation rate of the PMs by $NO_X$ and the like.

BEST MODE FOR CARRYING OUT THE INVENTION

Figure 1:
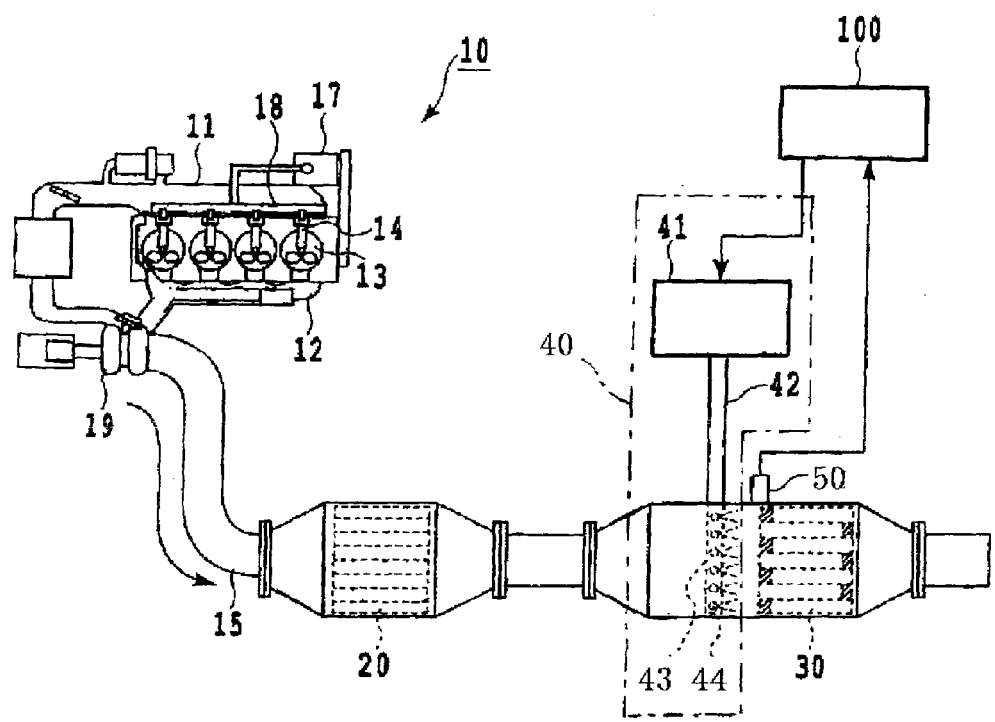
FIG. 1 is a diagrammatic drawing of a preferred embodiment of a device for purification of exhaust gas of the present invention, which is connected to an internal combustion engine.

Referring to the drawings, preferred embodiments of the present invention will hereinafter be described in detail. Note that, in the following descriptions and drawings, the same or equivalent elements are designated by the same reference symbols, and overlapped descriptions are omitted.

FIG. 1 shows a diagrammatic drawing of a preferred embodiment of a device for purification of exhaust gas connected to an internal combustion engine according to the present invention. In FIG. 1, a numeral 10 designates a compression ignition internal combustion engine (i.e. diesel engine), a numeral 11 designates an induction manifold communicated with an induction port, a numeral 12 designates an exhaust manifold communicated with an exhaust port, and a numeral 13 designates a combustion chamber. The fuel supplied from a fuel tank (not shown) to a high pressure pump 17 is pumped by the high pressure pump 17 to a common rail 18 and accumulated in pressure at a high pressure. Then, the highly-pressured fuel in the common rail 18 is directly injection-supplied from a fuel injection valve 14 to the fuel chamber 13. The exhaust gas from the diesel engine 10 is caused to pass the exhaust manifold 12 and a turbocharger 19, then flowed to an exhaust passage 15 located downstream thereof, and eventually emitted to the ambient air after subjected to the purification process described below in detail. The form of the diesel engine is not limited to the one equipped with such a common rail type fuel injection device.

In the exhaust gas passage 15 shown in FIG. 1, an NO oxidizing catalyst 20 for oxidizing NO in exhaust gas, a diesel particulate filter 30 (hereinafter referred to as "DPF") which serves as a particulate matter trapping device for trapping the particulate matters (PMs) in exhaust gas are disposed in series in order from upstream to downstream.

As the NO oxidizing catalyst 20 according to the present invention, the one which contains a porous oxide support and a noble metal supported thereto, and which can efficiently oxidize NO in exhaust gas to $NO_2$ is suitably used. A metal oxide constituting such a porous oxide support is not particularly limited, but can include, for example, alumina, silica, titania, zirconia, ceria, ceria-alumina solid solution, ceria-titania solid solution, ceria-zirconia solid solution, zirconia-titania solid solution, silica-alumina solid solution, zeolite, and the like. Moreover, one kind of metal oxide alone, a combination of two or more kinds of metal oxides, or a composite oxide can be used as the porous oxide support. The amount of such a porous oxide support is also not particularly limited, but is preferably within a range between 30 and 400 g per 1 liter of the substrate described below.

The noble metal includes platinum (Pt), palladium (Pd), rhodium (Rd), iridium (Ir), and ruthenium (Ru). Of these, Pt is particularly preferable from the viewpoint that the oxidation activity relative to NO is high. The supported amount of these noble metals is also not particularly limited, but is preferably within a range between 0.1 and 20 g per 1 liter of the substrate described below.

Metals including V, Cr, Mn, Fe, Co, Ni, Cu, Zn, Mo, Ag, In, and the like may be supported on the porous oxide support.

The form of the NO oxidizing catalyst 20 according to the present invention is also not particularly limited, but can be forms such as a monolith catalyst of a honeycomb form, pellet catalyst of a pellet form, and the like. The substrate used here is also not particularly limited, but a monolith-like substrate, a pellet-like substrate, a plate-like substrate, and the like can suitably be employed. Particularly, when the monolith substrate is used, the effect of the present invention tends to be more surely achieved. In addition, the material of these substrates is also not particularly limited, but substrates made of ceramics such as cordierite, silicon carbide, and mullite, and substrates made of metals such as stainless steel including chrome, nickel and aluminium are suitably employed.

The specific example of the NO oxidizing catalyst 20 according to the present invention includes the NO oxidizing catalysts described in, for example, Japanese Unexamined Patent Application Publication No. Hei 8-103636, Japanese Unexamined Patent Application Publication No. Hei 8-243356, Japanese Unexamined Patent Application Publication No. Hei 9-299795, Japanese Unexamined Patent Application Publication No. 2001-115824, Japanese Unexamined Patent Application Publication No. 2002-35587, Japanese Unexamined Patent Application Publication No. 2002-89246, Japanese Unexamined Patent Application Publication No. 2003-80033, Japanese Unexamined Patent Application Publication No. 2003-205223, Japanese Unexamined Patent Application Publication No. 2004-167354, and Japanese Unexamined Patent Application Publication No. 2006-46286.

The DPF 30 according to the present invention is not particularly limited in form, but may be of wall-flow type shown in FIG. 1, or of foam type. The wall-flow type DPF has a honeycomb structure in which a first passage provided with a stopper on the downstream side and a second passage provided with a stopper on the upstream side are alternately formed in compartment. The exhaust gas passes the flow passage wall surface from the first passage, and then flows into the second passage to subsequently flow downstream. At this time, the PMs in the exhaust gas are trapped by the flow passage wall surface. The material of such a DPF 30 is also not particularly limited, but the substrate made of ceramics such as cordierite, silicon carbide, silica, alumina, and mullite, and substrates made of metals such as stainless steel including chrome, nickel and aluminium are suitably employed. When the DPF 30 is coated with a catalyst including noble metals and the like, $O_3$ tends to be decomposed before the oxidization of the PMs. Thus, it is preferable that the DPF 30 be not coated with a catalyst.

In the device for purification of exhaust gas according to the present invention which is shown in FIG. 1, ozone supply means 40 which can supply ozone ($O_3$) is connected to DPF 30 between the above described NO oxidizing catalyst 20 and the DPF 30, i.e. downstream of the NO oxidizing catalyst 20 and upstream of the DPF 30. Such ozone supply means 40 includes ozonizer 41 which serves as ozone generating means, and an ozone supply nozzle 43 connected to the ozonizer 41 via an ozone supply passage 42.

As the ozonizer 41 according to the present invention, the one having a form which allows ozone to be generated while flowing the air or oxygen, which serves as a raw material, into the electric discharge tube to which a high voltage can be applied, or having any other type, can be used. However, $NO_x$ is formed when nitrogen is present in the gas supplied to the ozonizer 41. Thus, only oxygen is preferably supplied.

Note that, the air or oxygen which here serves as a raw material is the gas taken in from the outside of the exhaust gas passage, for example, the gas contained in the ambient air, unlike in the case of Document 4. That is not the gas which is contained in the exhaust gas in the exhaust gas passage as in the case of Document 4. In the ozonizer 41, the use of a raw material gas at a low temperature provides higher ozone generation efficiency than the use of a raw material gas at a high temperature. Therefore, it is possible to enhance ozone generation efficiency as compared to the case of Document 4 by generating ozone using the gas which is present outside the exhaust gas passage in the above manner.

The ozone supply nozzle 43 according to the present invention is preferably disposed immediately upstream of the DPF 30 so that the ozone injection-supplied therefrom is suppressed from being consumed by reacting with NO and the like in the exhaust gas, and then supplies ozone therefrom toward the DPF 30. In addition, the ozone supply nozzle 43 preferably has a plurality of ozone supply ports which are spread over the entire diameter of the upstream edge surface of the DPF 30 so that ozone can be supplied evenly over the entire upstream edge surface of the DPF 30. As the form of the ozone supply means 40, various kinds of forms are available in addition to the one having the ozone supply nozzle 43. For example, when only one ozone supply port is provided, the ozone supply port and the upstream edge surface of the DPF are preferably spaced apart from each other in a distance which allows ozone to be supplied evenly over the entire upstream edge surface.

Furthermore, in the device for purification of exhaust gas of the present invention shown in FIG. 1, a temperature sensor 50 is provided as exhaust gas temperature detecting means for detecting the temperature of the exhaust gas passing through the DPF 30, and is electrically connected to an ECU 100 which serves as ozone supply control means for controlling the ozone supply means 40 based on the temperature of the exhaust gas which is detected by means of the temperature sensor 50. The exhaust gas temperature detecting means according to the present invention is not limited to the temperature sensor 50, and may be means for estimating the temperature of the exhaust gas passing through the DPF 30 based on the operation state of the engine and the like using an engine characteristics map data and the like stored in the ECU 100. In addition, in the device for purification of exhaust gas of the present invention, although not shown, an exhaust gas pressure sensor for detecting the trapped amount and clogging of the PMs from a differential pressure between the upstream and downstream of the DPF 30, and an air-fuel ratio sensor for detecting the air-fuel ratio of the exhaust gas flowing in the DPF 30, or the like may be provided.

According to the above described device for purification of exhaust gas of the present invention shown in FIG. 1, at least part (preferably all) of the NO in exhaust gas is oxidized to $NO_2$ by means of the above described NO oxidizing catalyst 20. Then, when ozone is supplied from the ozone supply means 40 into the exhaust gas, $NO_x$ and ozone react with each other according to the following chemical reaction formulae, allowing the ozone to be consumed.

$$NO+O_3 \rightarrow NO_2+O_2 \tag{1}$$

$$NO_2+O_3 \rightarrow NO_3+O_2 \tag{2}$$

$$2NO_3 \rightarrow 2NO_2+NO_2 \tag{3}$$

However, in consideration of the reactivity between ozone and $NO_x$, $NO_2$ has the lower reactivity than that of NO. Thus, the amount of the ozone consumed according to the reaction in the formula (1) is reduced by previously oxidizing NO in exhaust gas to $NO_2$ in the above manner. As a result, a larger amount of ozone is used to oxidize and remove the PMs in the subsequent DPF 30. Accordingly, the reduction in the oxidation rate of the PM is sufficiently suppressed, resulting in the achievement of the high level PM purification efficiency.

Then, PMs are removed in the form of CO and $CO_2$ through the following reactions below between ozone and PMs in DPF 30.

$$C+O_3 \rightarrow CO+O_2 \tag{4}$$

$$C+2O_3 \rightarrow CO_2+2O_2 \tag{5}$$

Figure 2:
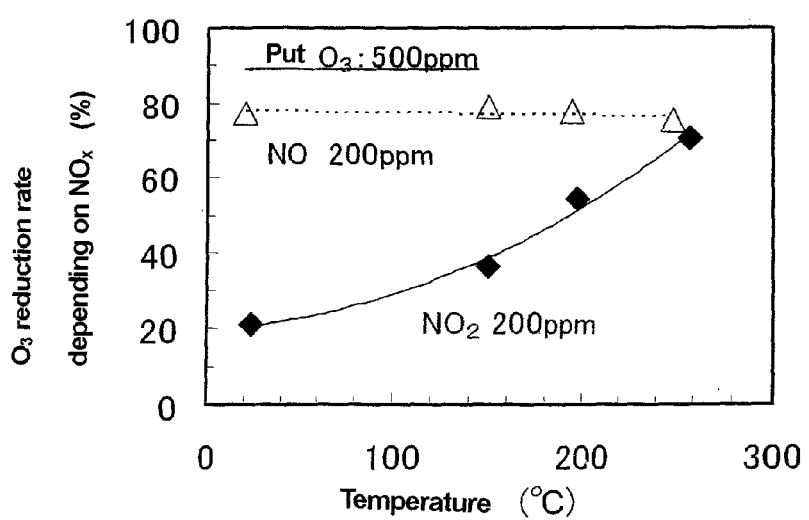
FIG. 2 is a graph showing a relationship between reduction rates of ozone reacted with NO or $NO_2$ and temperatures.

Note that, the following knowledge has been obtained by the present inventors. That is, the decomposition of $O_3$ is initiated at about 200° C. or more. The PMs are initiated to be oxidized by $NO_2$ at 200° C. or more. Moreover, when 500 ppm of ozone is put in, the reactivity of $NO_2$ is lower than that of NO at 300° C. or less (preferably at 250° C. or less) as shown in FIG. 2 in consideration of the reactivity between ozone and $NO_x$. At more than 300° C., the reactivity between ozone and $NO_x$ tends to become higher irrespective of kinds of $NO_x$.

Therefore, in the device for purification of exhaust gas of the present invention, ozone is supplied from the ozone supply means 40 when the temperature of the exhaust gas passing through the DPF 30 is within a range between a first predetermined temperature of 50° C. or more (more preferably 100° C. or more) and a second predetermined temperature of 300° C. or less (more preferably 250° C. or less). In a temperature range exceeding 300° C. (more preferably exceeding 250° C.), the PMs are preferably oxidized using only $NO_2$ formed by means of the NO oxidizing catalyst, without supplying ozone. If the ozone supply means 40 is controlled in the above manner, the consumption of ozone by the $NO_x$ in exhaust gas is more surely suppressed. As a result, the reduction in the oxidation rate of the PMs is sufficiently suppressed, achieving the higher level PM purification efficiency.

Note that the timing for supplying ozone in the above manner is preferably taken when the trapped amount of the PMs is at the predetermined value or more in the DPF 30.

In addition, a temperature of 50° C. or more is necessary to more surely oxidize NO to $NO_2$ by means of the NO oxidizing catalyst 20. Since 100° C. or more is more preferable, the NO oxidizing catalyst 20 is preferably mounted as upstream as possible in the exhaust gas passage 15.

Furthermore, in the device for purification of exhaust gas of the present invention, the amount of the $NO_x$ in exhaust gas is preferably previously reduced by using in combination with a different device for purification of exhaust gas including an EGR device and the like. When the amount of the $NO_x$ in exhaust gas is previously reduced in the above manner, the consumed amount of ozone is further reduced, and the PM oxidation efficiency thereby tends to be improved.

A preferred embodiment of the device for purification of exhaust gas of the present invention has been described above. In the present invention, another embodiment can be employed. For example, in the above embodiment, the wall-flow type of DPF is employed as the PM trapping device. In addition to this, various kinds of filter structures can be employed. In view of the shape and structure of the substrate, plate-like, cylinder-like, pellet-like, mesh-like (for example, the woven textile or unwoven textile of inorganic fibers, and metallic net) ones and the like can also be employed in addition to the above described honeycomb-like one.

Moreover, the present invention can be used in all of the internal combustion engine which possibly generates the PMs, in other than a diesel engine which is a compression ignition internal combustion engine. For example, a direct injection spark ignition internal combustion engine, more specifically a direct injection lean-burn gasoline engine, is included. In this engine, fuel is directly injected in a cylinder combustion chamber. In a high load area in which the injected amount of the fuel is large, the fuel is not fully burnt, and thereby there is a possibility of generating PMs. Even when the present invention is used in such an engine, the same effect as the above can be fully expected.

EXAMPLES

The present invention will more specifically be described below based on Example and Comparative examples. However, the present invention is not limited to the Example described below.

(1) Experimental Device

Figure 3:
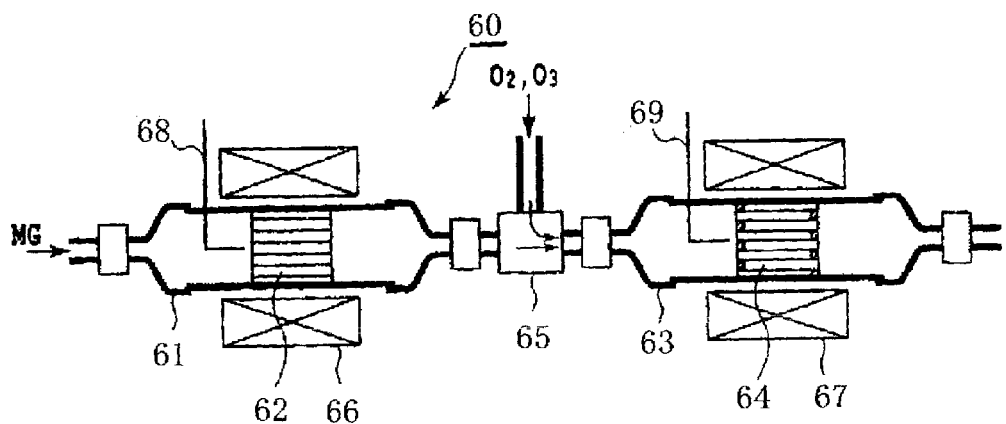
FIG. 3 is a diagrammatic drawing of an experimental device (device for purification of exhaust gas) used in Example and Comparative examples.

FIG. 3 shows a diagrammatic drawing of the experimental device used in the Example and Comparative examples. In the experimental device 60 shown in FIG. 3, a mock gas (MG) described below passes an NO oxidizing catalyst 62 disposed in an upstream silica tube 61, then passes a DPF 64 disposed in a downstream silica tube 63, and thereafter is emitted from an unillustrated exhaust duct to outside. The oxygen and ozone (or only oxygen) supplied from an unillustrated ozonizer are supplied as an implanted gas from a three-way elbow 65 disposed between the upstream silica tube 61 and the downstream silica tube 63, mixed with the mock gas, and then supplied, together with the mock gas, to the DPF 64. Electric heaters 66 and 67 are provided in the outer circumferential sections of the upstream silica tube 61 and the downstream silica tube 63, respectively, to control the temperatures of the NO oxidizing catalyst 62 and the DPF 64. In addition, temperature sensors 68 and 69 are provided to measure the temperatures of the positions immediately upstream of the NO oxidizing catalyst 62 and the DPF 64, respectively.

(2) Experimental Conditions

The electric heaters 66 and 67 were controlled such that the temperatures detected by means of the temperature sensors 68 and 69 were 200° C. The mock gas was composed of, by volume concentration, 210 ppm of NO, 5% of $O_2$, 3% of $H_2O$, and $N_2$ as balance. The flow rate of the mock gas was 9.5 L/min. Furthermore, the implanted gas was composed of 10000 ppm of ozone ($O_3$), and the balance was $O_2$ when ozone was supplied while the power supply of the ozonizer was turned on. On the other hand, the implanted gas was composed of $O_2$ only when the power supply of the ozonizer was turned off so as not to supply ozone, and the flow rate of the implanted gas was 0.5 L/min.

(3) Experimental Method $N_2$ was continued to be flowed until the temperatures detected by means of the temperature sensors 68 and 69 became constant (200° C.). The above described mock gas containing NO was flowed after the temperatures became constant. At the same time, $O_2$ was introduced into the ozonizer. Then, to generate ozone, the power supply of the ozonizer was turned on, and simultaneously $O_2$ was introduced.

The oxidized amount (oxidation rate) of the PMs in the DPF 64 was calculated from the concentrations of CO and $CO_2$ detected by means of an unillustrated exhaust gas analyzer. That is, the mole number during the time of measurement was obtained by dividing the product of the flow rate of the mock gas, the measured volume concentration and the measuring time by a volume equivalent to 1 mol (for example, 22.4 L). The oxidized amount (oxidation rate) of the PMs is calculated based on the mole number.

(4) Examples and Comparative Examples

Example 1

The NO oxidizing catalyst 62 and the DPF 64 having the specification shown below were disposed, and then the power supply of the ozonizer was turned on. In this state, the oxidized amount (oxidation rate) of the PMs was measured.

<NO Oxidizing Catalyst>

The catalyst prepared by coating with $Z_rO_2$ a honeycomb structure made of cordierite which had a diameter of 30 mm, a length of 50 mm, a cell wall thickness of 4 mil (milli inch length, $\frac{1}{1000}$ inch), and a cell number of 400 cpsi (cells per square inch) was used. The coated amount of $Z_rO_2$ was 120 g/L. A denominator L (liter) means per 1 L of a catalyst (hereinafter the same holds true). Pt was supported thereon using an aqueous solution containing diammine dinitro platinum. Thereafter, the catalyst was dried, and then calcinated at 300° C. for 1 hour to obtain an NO oxidizing catalyst. The supported amount of Pt was 10 g/L. The NO oxidizing catalyst 62 obtained in the above manner was disposed in the upstream silica tube 61 to carry out an experiment.

<DPF>

The DPF (not coated with a catalyst) made of cordierite and having a diameter of 30 mm, a length of 50 mm, a cell wall thickness of 12 mil, and a cell number of 300 cpsi on which the PMs were deposited was used. In order to deposit the PMs, the PMs were trapped by disposing a container, in which 12 pieces of honeycomb structure made of cordierite and having a diameter of 30 mm and a length of 50 mm was possibly mounted in parallel, in the exhaust gas pipe of a diesel engine (an emission of 2 L), and by distributing therein exhaust gas under the operation conditions of 2000 rpm and 30 Nm for 1 hour. The DPF 64 on which the PMs had been deposited in the above manner was disposed in the downstream silica tube 63 while the PMs-deposited surface was faced to the upstream side. An experiment was then carried out.

Comparative Example 1

Except that only the PM-deposited DPF 64 which was the same as the DPF used in Example 1 was disposed in the downstream silica tube 63 without disposing the NO oxidizing catalyst 62 in the upstream silica tube 61, and except that the mock gas was flowed without causing the mock gas to contain NO, the same manner as taken in Example 1 was taken (the power supply of the ozonizer was turned on) to measure the oxidized amount (oxidation rate) of the PMs.

Comparative Example 2

Except that only the PM-deposited DPF 64 which was the same as the DPF used in Example 1 was disposed in the downstream silica tube 63 without disposing the NO oxidizing catalyst 62 in the upstream silica tube 61, the same manner as taken in Example 1 was taken (the mock gas contained NO, and the power supply of the ozonizer was turned on) to measure the oxidized amount (oxidation rate) of the PMs.

Comparative Example 3

Except that the power supply of the ozonizer was turned off so as not to supply ozone, the same manner as taken in Example 1 was taken (the NO oxidizing catalyst was used, and the mock gas contained NO) to measure the oxidized amount (oxidation rate) of the PMs.

(5) Results of Experiment

Figure 4:
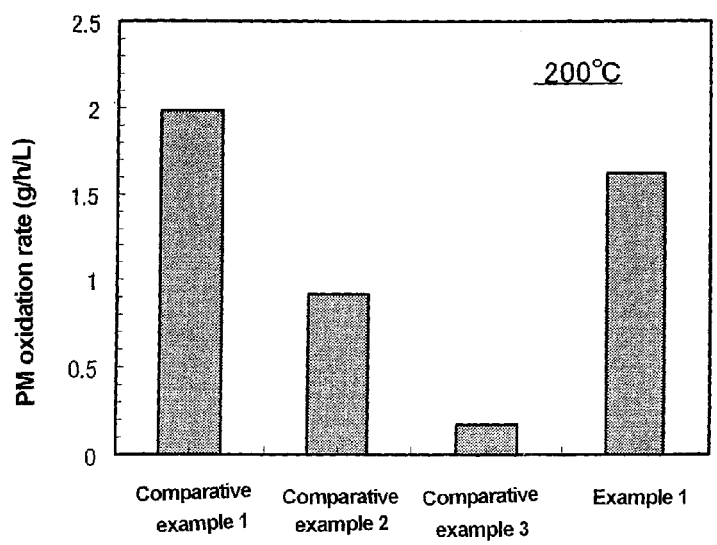
FIG. 4 is a graph showing the comparison of PM oxidation rate among Example 1 and Comparative examples 1 to 3

FIG. 4 shows the PM oxidation rate obtained 10 minutes after $N_2$ is switched to the mock gas (after introducing $O_2$ into the ozonizer) in Example 1 and Comparative examples 1 to 3. In FIG. 4, the unit of the PM oxidation rate of g/h/L assigned to the vertical axis indicates the number of grams of the PMs oxidized per 1 liter of the DPF and for 1 hour.

It was first found by comparing the result of Comparative example 1 with the result of Comparative example 2 that, when NO was present, the rate at which the PMs were oxidized by ozone was greatly reduced. In contrast, it was found by comparing the result of Example 1 with the result of Comparative example 2 that, when 85% of NO was oxidized to $NO_2$ by means of the NO oxidizing catalyst in Example 1, the reaction between ozone and $NO_x$ was suppressed, resulting in the sufficient suppression of the reduction in the rate at which the PMs was oxidized by ozone. It was also found by comparing the result of Example 1 with the result of Comparative example 3 that, when ozone was not supplied, the PM oxidation rate was notably reduced.

INDUSTRIAL APPLICABILITY

As described above, according to the present invention, it becomes possible to provide a device for purification of exhaust gas emitted from an internal combustion engine, such as a diesel engine, using a particulate matter trapping device for trapping PMs in exhaust gas in which a high level PM purification efficiency is achieved by making it possible to efficiently use ozone in oxidizing and removing the PMs using the ozone, and sufficiently suppressing the reduction in the oxidation rate of the PMs caused by $NO_x$ and the like.

The invention claimed is:

1. A device for purification of exhaust gas, comprising:
   an exhaust gas passage connected to an internal combustion engine;
   a particulate filter which is disposed in the exhaust gas passage, and which traps particulate matters in exhaust gas;
   an ozone supply member including an ozonizer, connected to the exhaust gas passage and on an upstream side of the particulate filter, and configured to supply ozone to the particulate filter;
   an NO oxidizing catalyst which is disposed in the exhaust gas passage and on an upstream side of the ozone supply member, and which oxidizes NO in the exhaust gas;
   means for detecting exhaust gas temperature which performs one of measurement and estimation of a temperature of the exhaust gas passing through the particulate filter; and
   means for controlling ozone supply which controls the ozone supply member based on the temperature of the exhaust gas detected by the means for detecting exhaust gas temperature, such that ozone is supplied when the temperature of the exhaust gas is within a range between a first predetermined temperature of 50° C. or more and a second predetermined temperature of 300° C. or less;
   wherein the ozonizer generates ozone from one of air and oxygen serving as a raw material and being taken in as a gas from outside of the exhaust gas passage.

2. The device for purification of exhaust gas according to claim 1, wherein the means for controlling ozone supply controls the ozone supply member such that ozone is supplied when the amount of particulate matters trapped in the particulate filter is at a predetermined value or more.

3. The device for purification of exhaust gas according to claim 1, wherein the ozone supply member comprises:
   an ozone supply passage connected to the ozonizer; and an ozone supply nozzle which is connected to the ozone supply passage, and which is disposed in the exhaust gas passage and on an upstream side of the particulate filter.

4. The device for purification of exhaust gas according to claim 3, wherein the ozonizer generates ozone while the one of air and oxygen is being flowed in an electric discharge tube to which a high voltage can be applied.

5. The device for purification of exhaust gas according to claim 1, wherein the NO oxidizing catalyst comprises a porous oxide support and a noble metal supported thereto, and can oxidize NO in exhaust gas to $NO_2$.

6. The device for purification of exhaust gas according to claim 1, wherein the particulate filter substantially does not comprise a catalyst which decomposes ozone.

* * * * *